United States Patent Office 3,769,359
Patented Oct. 30, 1973

3,769,359
DIMERIZATION OF STYRENE COMPOUNDS
Stephen N. Massie, Palatine, Ill., assignor to Universal Oil Products Company, Des Plaines, Ill.
No Drawing. Filed June 7, 1972, Ser. No. 263,363
Int. Cl. C07c 3/12
U.S. Cl. 260—669 P
10 Claims

ABSTRACT OF THE DISCLOSURE

Styrene compounds are dimerized by treating said compounds in a solution of a carboxylic acid containing a mineral acid.

---

This invention relates to a process for the dimerization of styrene compounds, and particularly to a process whereby a styrene compound of the type hereinafter set forth in greater detail is dimerized by being treated in the presence of carboxylic acids which contain a mineral acid.

Synthetic materials and particularly plastics will find a wide variety of uses in modern day living. A particular type of plastic comprises polyolefin compositions such as polyethylene, polypropylene, copolymers and terpolymers thereof. Each individual plastic has its own characteristics and is adaptable for particular uses which require these characteristics. However, it is necessary in some instances to modify or alter the characteristics of certain polyolefin compositions in order to render the thus modified compositions useful in some other way. In this respect it is known that certain compounds such as styrene dimers will impart desirable impact-resistance to polyolefin compositions such as the aforesaid polyethylene or polypropylene.

It is therefore an object of this invention to provide a process for preparing dimers of styrene compounds.

A further object of this invention is to provide a process for the dimerization of a styrene compound using certain catalytic compounds of matter to effect the dimerization.

In one aspect an embodiment of this invention resides in a process for the dimerization of a styrene compound which comprises treating said compound in a solution of a carboxylic acid which contains a mineral acid at dimerization conditions, and recovering the resultant dimer.

A specific embodiment of the invention is found in a process for the dimerization of styrene which comprises treating said styrene in an acetic acid solution which contains sulfuric acid at a temperature in the range of from about ambient to 200° C. and a pressure in the range of from about atmospheric to about 100 atmospheres, and recovering the resultant 1,3-diphenyl-1-butene.

Other objects and embodiments will be found in the following further detailed description of the present invention.

As hereinbefore set forth the present invention is concerned with a process for the dimerization of styrene compounds which comprises treating said compounds in the solution of a carboxylic acid which contains a relatively small amount of a mineral acid, said treatment being effected at dimerization conditions. These dimerization conditions will include a temperature in the range of from about ambient (about 20° to 25° C.) up to about 200° C. and a presure in the range of from atmospheric up to about 100 atmospheres or more.

The superatmospheric pressures which may be employed in effecting the reaction are afforded by the introduction of a substantially inert gas such as nitrogen into the reaction zone, the amount of pressure which is utilized being that which is sufficient to maintain a major portion of the reactants in a liquid phase. The dimerization reaction is effected during a time period which may range from about 0.5 up to about 40 hours or more in duration, the residence time being determined by other reaction condition parameters, especially temperature.

Examples of styrene compounds which may undergo dimerization according to the process of the present invention will include styrene, α-methylstyrene, 1-phenyl-1-propene (β-methylstyrene), as well as styrene compounds containing a substituent on the aromatic ring such as o-methylstyrene, m-methylstyrene, p-methylstyrene, o-ethylstyrene, m-ethylstyrene, p-ethylstyrene, o-propylstyrene, m-propylstyrene, p-propylstyrene, etc. It is to be understood that the aforementioned styrene compounds are only representative of the class of compounds which may be subjected to dimerization according to the process herein described and that the present invention is not necessarily limited thereto.

The styrene compounds are treated in a solution of a carboxylic acid which contains a mineral acid. Examples of carboxylic acids which may be employed include those containing from 2 to about 8 carbon atoms such as acetic acid, propionic acid, butyric acid, valeric acid, caproic acid, heptanoic acid, caprylic acid, etc. It is also contemplated within the scope of this invention that higher molecular weight carboxylic acids such a pelargonic acid, capric acid, undecylic acid, lauric acid, etc. may also be used if these acids are dissolved in an inert organic solvent such as benzene, toluene, the xylenes, chloroform, methyl alcohol, ethyl alcohol, etc. The aforementioned solutions of carboxylic acids will contain a solution of a mineral acid in an amount ranging from about 1 part per ten thousand to about 1000 parts per ten thousand of mineral acid. Some examples of these solutions of mineral acids which may be employed will include sulfuric acid, hydrochloric acid, phosphoric acid, etc., the concentrations of these acids in the mineral acid solution ranging from about 1% to about 96%.

The process of the present invention may be effected in any suitable manner and may comprise either a batch or continuous type operation. For example when a batch type operation is used, the styrene compound along with the solution of the carboxylic acid containing the mineral acid is placed in an appropriate apparatus. In the event that pressures above atmospheric are to be employed, the reactor will comprise an autoclave of the rotating or mixing type or other pressure-resistant vessels. The vessel is then pressured to the desired operating level and thereafter heated to a predetermined operating temperature for a residence time within the durations hereinbefore set forth. Alternatively if atmospheric pressures are to be employed, an open vessel may be utilized. Upon completion of the desired residence time, heating is discontinued, and the reactor is allowed to return to room temperature. Any excess pressure if present is discharged, the reactor is opened, and the reaction mixture is recovered therefrom. After separation from the catalyst the liquid mixture is subjected to conventional means of purification such as washing, drying, distillation, crystallization, etc. whereby the undesired dimer is separated from unreacted starting materials and/or unwanted side products which may have formed and recovered.

It is also contemplated within the scope of this invention that the dimerization process may be effected in a continuous manner. When such a type of operation is used, the styrene compound and the solution of a carboxylic acid containing a mineral acid are continuously charged to a reactor which is maintained at the proper operating conditions of temperature and pressure. Alternatively speaking, it is also contemplated within the scope of this invention, that the styrene compound and the solution of the carboxylic acid containing a mineral acid may be admixed prior to entry into said reactor and charged thereto in a single stream. Upon completion of the desired residence time, the reactor effluent is continuously withdrawn and subjected to conventional means of separation of the type hereinbefore set forth whereby the desired dimer is recovered and passed to storage, while any unreacted starting materials and the acidic solution may be recycled to form a portion of the feed stock.

Examples of dimers of styrene compounds which may be prepared according to the process of this invention will include 1,3-diphenyl-1-butene,
2,4-diphenyl-4-methyl-2-pentene,
1,3-diphenyl-2-methyl-1-pentene,
1,3-di-(o-tolyl)-1-butene,
1,3-di-(m-tolyl)-1-butene,
1,3-di-(p-tolyl)-1-butene,
1,3-di-(o-ethylphenyl)-1-butene,
1,3-di-(m-ethylphenyl)-1-butene,
1,3-di-(p-ethylphenyl)-1-butene,
1,3-di-(o-proplyphenyl)-1-butene,
1,3-di-(m-proplyphenyl)-1-butene,
1,3-di-(p-proplyphenyl)-1-butene, etc.

It is to be understood that the aforementioned dimers are only representative of the class of compounds which may be prepared and that the present invention is not necessarily limited thereto.

The following examples are given to illustrate the process of the present invention which, however, are not intended to limit the generally broad scope of the present invention to strict accordance therewith.

EXAMPLE I

To the glass liner of a rotating autoclave was added 26 g. (0.25 mole) of styrene and 60 g. (1.0 mole) of acetic acid containing 0.1 g. of concentrated sulfuric acid. The liner was then sealed into the autoclave, flushed with nitrogen and thereafter pressured to 35 atmospheres with nitrogen. Following this, the autoclave and contents thereof were heated to a temperature of 140° C. and maintained thereat for a period of 16 hours while continually rotating the autoclave. At the end of this period the autoclave was allowed to return to room temperature, the excess pressure was discharged, the autoclave was opened and the liner and contents thereof were removed. Analysis of the liquid by a gas chromatograph disclosed the fact that approximately 50% of the styrene was converted to trans-1,3-diphenyl-1-butene. This analysis was verified by a similar analysis performed on an authentic sample of the dimer.

EXAMPLE II

To the glass liner of a rotating autoclave having a capacity of 850 cc. is added 32 g. (0.25 mole) of α-methylstyrene and 60 g. (1.0 mole) of acetic acid containing 0.1 g. of concentrated sulfuric acid. The liner is sealed into the autoclave, flushed with nitrogen and pressured to 35 atmospheres with an additional amount of nitrogen. Thereafter the autoclave and contents thereof are heated to a temperature of 150° C. and maintained thereat for a period of 10 hours. At the end of the 10-hour period, heating is discontinued, the autoclave is allowed to return to room temperature, the excess pressure is discharged and the autoclave is opened. The product mixture is transferred to a separatory funnel, diluted with ether and washed with water. The organic phase which separates from the aqueous phase is then stirred with a sodium bicarbonate solution until the evolution of gas ceases. The organic layer which separates from the aqueous layer is dried by treatment with anhydrous potassium carbonate and anhydrous sodium sulfate following which the remaining ether is evaporated and the remaining oil is fractionated on a spinning band distillation column. The desired cuts comprising 2,4-diphenyl-4-methyl-2-pentene are separated, the presence of this compound being verified by means of gas chromatographic analysis.

EXAMPLE III

In like manner 32 g. (0.25 mole) of 1-phenyl-1-propene and 73 g. (1.0 mole) of propionic acid containing 0.2 g. of concentrated phosphoric acid are placed in the glass liner of a rotating autoclave and treated in a manner similar to that hereinbefore set forth, that is, by pressuring the autoclave with 35 atmospheres of nitrogen and heating to a temperature of 120° C. for a period of 16 hours. Upon completion of the desired residence time heating is discontinued, the autoclave is allowed to return to room temperature, the excess pressure is discharged and the reaction product is recovered therefrom. The product is then treated in a manner similar to that set forth in Example II above, the presence of the desired dimer comprising 1,3-diphenyl-2-methyl-1-pentene being verified by means of infra-red and nuclear magnetic resonance analyses.

EXAMPLE IV

To the glass liner of a rotating autoclave is charged 38.4 g. (0.3 mole) of p-methylstyrene along with 60 g. (1.0 mole) of acetic acid which contains 0.1 g. of concentrated sulfuric acid. The liner is sealed into the autoclave which is thereafter flushed with nitrogen and pressured to 35 atmospheres with an additional amount of nitrogen. The autoclave is then heated to a temperature of 150° C. and maintained thereat for a period of 12 hours. At the end of this 12 hour period, heating is discontinued, the autoclave is allowed to return to room temperature and the excess pressure is discharged therefrom. The autoclave is opened, the reaction mixture is recovered and placed in a separatory funnel. After being diluted with ether and washed with water, the organic phase is stirred with a sodium bicarbonate solution until the evolution of gas ceases. After separation of the layers, the organic layer is washed with saturated brine and dried by treatment with anhydrous potassium carbonate and anhydrous sodium sulfate. The dried product is placed on a steam bath to remove the remaining ether and thereafter fractionated on a spinning band distillation column. This distillation will result in the recovery of the desired product comprising 1,3-di-(p-tolyl)-1-butene, the presence of this compound being verified by means of infra-red analysis and nuclear magnetic resonance analysis.

EXAMPLE V

To illustrate the operability of the process of the present invention at lower temperatures, another experiment was run in which 26 g. (0.25 mole) of styrene, 60 g. (1.0 mole) of acetic acid and 0.1 g. of concentrated hydrochloric acid were placed in an alkylation flask equipped with a magnetic stirrer. The heat of the stirrer raised the temperature to about 30° C. while the reaction was being run for a period of 72 hours. At the end of the 72-hour period, heat was applied to the flask and the temperature rose to 55° C. Upon completion of an additional 20 hour period, heating was discontinued and the reaction product was recovered. The liquid product was analyzed by means of a gas chromatograph which disclosed the presence of trans-1,3-diphenyl-1-butene.

I claim as my invention:

1. A process for the dimerization of a styrene compound which comprises subjecting said compound to dimerization conditions in a solution of a carboxylic acid consisting of carbon, hydrogen and oxygen, said solution containing from about 1 to about 100 parts per ten thousand of a mineral acid.

2. The process as set forth in claim 1 in which said dimerization conditions include a temperature in the range of from about ambient to about 200° C. and a pressure in the range of from atmospheric to about 100 atmospheres.

3. The process as set forth in claim 1 in which said carboxylic acid is acetic acid.

4. The process as set forth in claim 1 in which said carboxylic acid is propionic acid.

5. The process as set forth in claim 1 in which said mineral acid is sulfuric acid.

6. The process as set forth in claim 1 in which said mineral acid is phosphoric acid.

7. The process as set forth in claim 1 in which said styrene compound is styrene and said dimer is 1,3-diphenyl-1-butene.

8. The process as set forth in claim 1 in which said styrene compound is α-methylstyrene and said dimer is 2,4-diphenyl-4-methyl-2-pentene.

9. The process as set forth in claim 1 in which said styrene compound is 1-phenyl-1-propene and said dimer is 1,3-diphenyl-2-methyl-1-pentene.

10. The process as set forth in claim 1 in which said styrene compound is p-methylstyrene and said dimer is 1,3-di-(p-tolyl)-1-butene.

References Cited
UNITED STATES PATENTS

| | | | |
|---|---|---|---|
| 3,686,339 | 8/1972 | Schecker et al. | 260—669 P |
| 3,691,244 | 9/1972 | Koehler et al. | 260—669 P |
| 2,215,569 | 9/1940 | Stanley et al. | 260—669 P |
| 2,429,719 | 10/1947 | Hersberger et al. | 260—669 P |
| 2,851,501 | 9/1958 | Benz et al. | 260—669 P |

CURTIS R. DAVIS, Primary Examiner

U.S. Cl. X.R.

260—668 C